June 19, 1962  A. WACHTEL  3,039,972
ELECTROLUMINESCENT PHOSPHOR
Filed Jan. 11, 1961
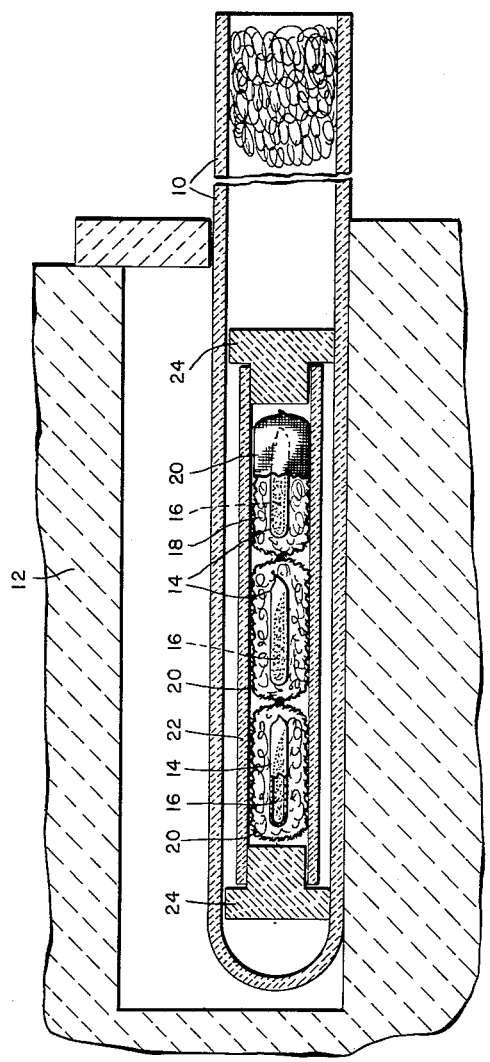
INVENTOR.
ANSELM WACHTEL.
BY
W. D. Palmer
ATTORNEY.

United States Patent Office 3,039,972
Patented June 19, 1962

3,039,972
ELECTROLUMINESCENT PHOSPHOR
Anselm Wachtel, Parlin, N.J., assignor to Westinghouse Electric Corporation, East Pittsburgh, Pa., a corporation of Pennsylvania
Filed Jan. 11, 1961, Ser. No. 82,117
17 Claims. (Cl. 252—301.6)

This invention relates to phosphor material and method and, more particularly, to electroluminescent phosphor material and a method for making such phosphor material. This application is a continuation-in-part of application S.N. 807,730, filed April 20, 1959, now abandoned, and owned by the present assignee.

Electroluminescence was first comprehensively disclosed by G. Destriau, one of this earlier publications appearing in London, Edinburgh and Dublin Philosophical Magazine, Series 7, volume 38, No. 285, pages 700–737 (October 1947), article titled "The New Phenomenon of Electrophotoluminescence." In this now well-known phenomenon, selected phosphor materials are placed within the influence of an electric field, such as by sandwiching the phosphor and mixed dielectric material between two spaced electrodes and applying an alternating potential to these electrodes. The resulting electric field which is created excites the electroluminescent phosphor to cause it to produce visible radiations.

To date, the known electroluminescent phosphor materials are limited with respect to the colors in which they electroluminesce. Individual phosphors are known which produce blue and green radiations and others are known which produce yellow, orange and red radiations and the phosphor material has to be specially selected with respect to the color which is desired to be achieved. Phosphors which electroluminesce with good efficiency in the red region of the visible spectrum are few in number and are relatively poor. The best generally known, red-emitting electroluminescent phosphor produced to date is zinc selenide activated by copper and such a phosphor is described in U.S. Patent No. 2,859,367, dated November 4, 1958. Zinc selenide phosphors are hazardous to prepare, however, as selenides are extremely toxic in nature, requiring very elaborate venting systems.

It is the general object of the invention to avoid and overcome the foregoing and other difficulties of and objections to prior-art practices by the provision of electroluminescent phosphor wherein the color can be readily varied throughout much of the visible spectrum, including the red region.

It is another object to provide an excellent red-emitting electroluminescent phosphor which can be prepared without the use of extremely toxic materials.

It is a further object to provide a method for preparing electroluminescent phosphor which incorporates mercuric sulfide as a basic constituent thereof.

It is an additional object to provide method details for preparing an improved electroluminescent phosphor which can be selected to electroluminesce in any color from green to red.

The aforesaid objects of the invention, and other objects which will become apparent as the description proceeds, are achieved by providing copper-activated, zinc-mercuric sulfide phosphor and copper-activated, zinc-cadmium-mercuric sulfide phosphor. The atom ratio of zinc to mercury in the phosphor as well as the atom ratio of cadmium to mercury in the phosphor are controlled, as is the amount of copper compound which is used in preparing the phosphor raw mix. In addition, there has been provided a pressure-firing method for preparing electroluminescent phosphor material which includes mercuric sulfide as a basic constituent thereof, as well as method details for preparing such a phosphor.

For a better understanding of the invention, reference should be had to the accompanying drawing wherein the sole FIGURE illustrates in sectional view a firing container as used in preparing the present phosphor.

The present electroluminescent phosphor has, as a basic matrix, Group IIB metal sulfide which is either zinc-mercuric sulfide or zinc-cadmium-mercuric sulfide. The phosphor includes copper as activator and a sufficient amount of coactivator, differing by two in valence from copper activator, for good electroluminescent response. With respect to the requirement for a coactivator, the phosphor is similar to most other copper-activated, sulfide-type electroluminescent phosphors. As is well known in the electroluminescent phosphor art, in order to make a good copper-activated, sulfide-type electroluminescent phosphor, the charges within the phosphor matrix are compensated. In explanation, the copper activator has a "one plus" valence and in order to balance the charges within the phosphor, it is necessary to add coactivator having a valence which differs by two from the valence of the copper activator. Suitable coactivators for the present phosphor are chlorine, bromine, iodine, aluminum, scandium, gallium or indium, or any mixtures thereof. The requirement for coactivator materials in copper-activated zinc-sulfide photoluminescent phosphors is also known and for a discussion on this, reference is made to article by F. E. Williams, "Journal of the Optical Society of America," vol. 47, No. 10, pages 869–876 (October 1957).

The phosphor of this invention incorporates mercuric sulfide as a basic constituent and the phosphor must be fired at temperatures of at least 600° C., and preferably at considerably higher temperatures, to enable it to be processed. Mercuric sulfide sublimes at atmospheric pressure at a temperature of about 580° C. Therefore to prepare the phosphor, it is necessary to conduct the phosphor firing under pressure. Because of this, it is desirable to avoid any materials in the phosphor raw mix which tend to form gaseous decomposition products, such as ammonium chloride, or the anion of the usual form of copper compound addition, such as the acetate radical. In addition, even small percentages of moisture which may be present in the raw material are hazardous when firing under pressure. Because of this, it is desirable first to prepare either copper-activated, zinc-sulfide phosphor or copper-activated, zinc-cadmium sulfide phosphor in the usual manner. In this regard, reference is made to U.S. Patent No. 2,874,128, dated February 17, 1959, for a method for processing copper-activated, zinc-sulfide phosphor which does not include mercuric sulfide as a basic constituent thereof. As a specific example, zinc sulfide in amount of about 10 grams is mixed with 0.2 mole percent of copper as acetate and 0.13 mole percent of chlorine as ammonium chloride. To this is added 5% by weight of the raw mix of elemental sulphur. This mixture is fired in a nitrogen atmosphere and a partially closed container at a temperature of 950° C. for ninety minutes, in accordance with the foregoing patent. This first firing produces a greenish-blue-emitting electroluminescent phosphor. Thereafter 0.016 mole of the foregoing phosphor is mixed with 0.004 mole of mercuric sulfide and five milligrams of sulphur. The mercuric sulfide is preferably prepared by reacting mercury and sulphur. This phosphor raw mix is placed into a silica tube having an internal diameter of 7.5 mm., an O.D. of 9.5 mm. and a length of 40 mm. The silica tube is evacuated and sealed, taking care to remove all possible moisture. The sealed tube is encased in silica wool and wrapped with silica cloth in such manner as to fit tightly into a ceramic tubular container having an I.D. of 30 mm., an O.D. of 40 mm. and a length of 110 mm. This assembly is then placed into the usual silica firing tube, the function of which is to provide additional insulation as well as a means for supporting the ceramic container to enable convenient loading and unloading from the firing furnace. The phosphor firing temperature is from 600° C. to 1100° C. for a period of at least 10 minutes, with the lower the firing temperature the longer the firing time. The preferred firing temperature is from 800° C. to 950° C. and the phosphor is preferably fired within this temperature range for at least one hour. As a specific example, the foregoing phosphor is fired at a temperature of 900° C. for about 16 hours.

In the sole figure of the drawing is shown the loaded outer firing tube 10 in position within a conventional firing furnace 12. Individual silica firing tubes 14 as described hereinbefore are packed with the phosphor raw mix 16 in amount as described hereinbefore. The tubes 14 have silica wool 18 packed thereabout and are retained in position by a silica cloth jacket 20. In the embodiment as shown, three of these jacketed firing tubes 14 have been placed within a ceramic container 22 and additional silica wool is placed between the individual jacketed firing tubes 14 to provide additional insulation. The ceramic container 22 is maintained in a centrally disposed position within the outer firing tube 10 by means of firebrick supporting spacers 24. The phosphor is fired for the foregoing indicated period and thereafter is allowed to cool, preferably without any forced cooling, in order to minimize any possible temperature gradients which tend to cause the mercuric sulfide to segregate from the phosphor. The extensive insulation of the firing tubes 14 is also effective to prevent temperature gradients during phosphor cooling. Thereafter the outer tube 10 is removed from the furnace 12 and the silica firing tubes 14 are removed and broken open. The phosphor is then desirably washed in a solution which is a solvent for cuprous sulfide but which is not a solvent for zinc sulfide, in order to remove excess cuprous sulfide from the surface of the phosphor. As a specific example, the fired phosphor can be washed in a one-normal solution of sodium, potassium or ammonium cyanide, thiosulphate or thiocyanate, for example, or any mixtures of the foregoing. A washing solution of sodium cyanide is preferred. The concentration of this washing solution is not critical and can vary over a wide range. Insulated firing tubes such as described hereinbefore are preferred for best results. Such insulation is only desirable, however, and can be dispensed with if desired. As in the case of the usual copper-activated electroluminescent phosphor, apparently some cuprous sulfide segregations remain in the phosphor.

The emission color of the present phosphor can be varied from green to very deep red, depending upon the relative concentration of zinc, cadmium and mercury. The atom ratio of zinc to mercury in the phosphor can vary from 100:1 to 3:1. At a zinc to mercury atom ratio of 100:1, the phosphor will be green in color and as the proportion of mercury is increased with respect to zinc, the color of the phosphor changes toward the longer wavelengths. Good results are obtained with a zinc-cadmium-mercuric sulfide phosphor in which the atom ratio of cadmium to mercury is less than 1.5 and preferably is from 1:1 to 1.3:1. Also, as with the usual electroluminescent phosphor, in order to provide sufficient copper in the final phosphor it is desirable to start with some excess copper in the phosphor raw mix. After the phosphor has been processed by firing, any excess copper is desirably washed off with a solution which is a solvent for cuprous sulfide, but which is not a solvent for zinc sulfide, as indicated hereinbefore. In order to provide good electroluminescent brightness for the present phosphor, copper in compound form is included in the raw mix for the phosphor in such amount as to provide from 0.00075 to 0.035 gram atom of copper per gram mole of group IIB metal sulfide in the basic matrix of the phosphor. Preferably copper in compound form is added to the phosphor raw mix in such amount as to provide from 0.00075 to 0.01 gram atom of copper per gram mole of group IIB metal sulfide in the basic matrix of the phosphor. While copper additions up to 0.035 gram atom per gram mole of matrix will provide good electroluminescent brightness, the fired phosphor becomes quite hard with copper additions which exceed the preferred range. This makes processing difficult. The coactivator is also desirably added in compound form to the phosphor raw mix before the first firing. In the case of non-volatile coactivator, such as aluminum, scandium, gallium and indium, which can be added as the sulfide for example, the amount of coactivator should be present in such amount as to include from 0.00005 to 0.004 gram atom, and preferably not exceeding 0.002, of these metals per gram mole of group IIB metal sulfide in the final basic matrix for the phosphor. This coactivator metal should not be added in such gram-atom amount as to exceed the gram atoms of copper in compound form which are present in the raw mix for the phosphor. When volatile coactivator is used, such as bromine, chlorine or iodine added as the ammonium halide for example, the amount of volatile coactivator which is included in the raw mix before the first firing will vary depending upon the firing conditions which are used. When first firing the present phosphor in the manner as described in the aforementioned U.S. Patent No. 2,874,128, the amount of volatile coactivator which is included in the raw mix before such first firing should be present in amount of from 0.00075 to 0.01 gram atom of halogen per gram mole of group IIB metal sulfide in the basic matrix of the prepared phosphor. If an open boat were to be used in such firing, however, considerably more volatile coactivator would normally be required in the raw mix since much of this would be lost on firing.

In the following table, designated Table I, are given specific examples of phosphors prepared in accordance with the present invention, which phosphors have different electroluminescent emission colors. In preparing all of the phosphor as given in these examples, zinc sulfide and cadmium sulfide in the indicated gram proportions were mixed with 0.0252 gram copper acetate, 0.0188 gram ammonium bromide, 0.0127 gram ammonium iodide and 0.1 gram elemental sulphur. This first raw mix was fired as indicated hereinbefore to produce a copper-activated zinc-cadmium sulfide phosphor. Thereafter mercuric sulfide was added in the amount as indicated for each example. This second raw-mix was placed into the small silica tubes 14 as described hereinbefore. In all of the following examples, 10 milligrams of elemental sulphur were added to the phosphor raw mix before the second firing. The sulphur addition before the first and second firings is desirable for best results, but can be dispensed with if desired. In the following Table I, the first two columns list the gram weights of zinc sulfide and cadmium sulfide used as a raw mix for the first firing. The gram additions of mercuric sulfide added to the first-fired material before the second firing are listed in the third column. The composition for the finished phosphor in terms of mole percents of zinc, cadmium and mercury are given in the next three columns, followed by the resulting electroluminescent emission color.

Table I

| ZnS, Grams (Added in first firing) | CdS, Grams | HgS, Grams | Composition of prepared phosphor in mole percent | | | Electroluminescent Emission Color |
|---|---|---|---|---|---|---|
| | | | Zn | Cd | Hg | |
| 1.93 | 0.0289 | 0.0353 | 98.26 | 0.99 | 0.75 | Green. |
| 1.91 | 0.0578 | 0.071 | 96.54 | 1.96 | 1.5 | Yellow-Green. |
| 1.89 | 0.0867 | 0.1062 | 94.85 | 2.90 | 2.25 | Green-Yellow. |
| 1.87 | 0.1156 | 0.144 | 93.16 | 3.84 | 3 | Yellow. |
| 1.83 | 0.1734 | 0.220 | 89.86 | 5.64 | 4.5 | Do. |
| 1.79 | 0.2312 | 0.297 | 86.64 | 7.36 | 6 | Orange-Yellow. |
| 1.75 | 0.289 | 0.378 | 83.5 | 9.00 | 7.5 | Orange. |
| 1.71 | 0.362 | 0.481 | 79.62 | 11.00 | 9.38 | Orange-Red. |
| 1.66 | 0.434 | 0.592 | 75.95 | 12.80 | 11.25 | Bright red. |
| 1.61 | 0.509 | 0.700 | 72.50 | 14.40 | 13.10 | Red. |
| 1.56 | 0.578 | 0.824 | 69.0 | 16.00 | 15 | Deep red. |
| 1.51 | 0.652 | 0.945 | 65.70 | 17.40 | 16.9 | Very deep red. |
| 1.46 | 0.723 | 1.07 | 60.95 | 20.30 | 18.75 | Do. |

The zinc-cadmium-mercuric sulfide modification of the present phosphor is preferred over the zinc-mercuric-sulfide modification because of somewhat better brightness and homogeneity. Zinc-mercuric sulfide phosphors can be prepared to match the color for any of the examples given in Table I hereinbefore by inceasing the mole percent of mercury in the prepared phosphor by one-third, with the remainder of the basic phosphor matrix comprising zinc sulfide.

The present phosphor can be made as an excellent red-emitting electroluminescent phosphor. The best-known red electroluminescent phosphor of the prior art is zinc selenide activated by copper, as noted hereinbefore. For operation at 400 cycles, 88.4 mole percent of zinc sulfide can be mixed with 11.6 mole percent of cadmium sulfide, 0.63 mole percent of copper as acetate, 0.65 mole percent of each of ammonium bromide and ammonium iodide and a small amount of sulphur. This mixture is fired for a period of one hour at a temperature of 950° C. in the manner as described hereinbefore. Thereafter, sufficient mercuric sulfide is added to the resulting first-fired material in such amount to provide 8.7 mole percent of mercuric sulfide. A small amount of additional sulphur is also added. The second firing is conducted at 900° C. for two hours. Thereafter, the phosphor is cooled and washed as indicated hereinbefore. The brightness of the resulting phosphor at 400 cycles is 0.89 ft. lambert and the brightness of the best-available copper-activated zinc selenide phosphor under the same operating conditions is 0.017 ft. lambert. Thus the present phosphor is more than 50 times brighter than the best prior-art red electroluminescent phosphor when operated at a frequency of 400 cycles. These two phosphors had similar ICI color coordinates. For operation at 10,000 cycles, 86 mole percent of zinc sulfide and 14 mole percent of cadmium sulfide are mixed with 0.63 mole percent of copper as acetate, ammonium bromide and iodide, in amount as indicated hereinbefore, plus a small amount of sulphur. The raw mix is first fired as indicated hereinbefore and then mixed with 10.5 mole percent of mercuric sulfide and a small amount of sulphur and processing completed as per the immediately preceding example. The brightness of this phosphor at 10,000 cycles is 7.9 ft. lamberts and the brightness of the foregoing zinc selenide phosphor under the same conditions of operation is 2.24 ft. lamberts, the ICI coordinates being the same.

The preferred procedure for preparing the present phosphor is the two-step firing process as described herein. The purpose of this two-step firing process is to eliminate substantially all moisture and occluded gases which may be present in the phosphor raw mix. After raw-mix materials have been fired in accordance with the first firing step, as outlined hereinbefore, the phosphor will be photoluminescent and unless the proportions of cadmium are relatively large, the phosphor will also be electroluminescent. With respect to the final phosphor, however, this first-fired phosphor still constitutes a part of a raw mix.

It is also possible to prepare the present phosphor using a one-step firing procedure. With such a technique, substantially all occluded gases and moisture should be removed from the raw-mix constituents before firing and in addition, no appreciably volatile constituents other than mercuric sulfide and elemental sulphur should be used as a part of the raw mix. As an example, zinc sulfide, cadmium sulfide and mercuric sulfide can be mixed in the desired proportions. Copper can be added as the sulfide and the necessary coactivator such as chlorine can be added as zinc chloride for example. Substantially all moisture should be removed from the raw mix as this is particularly dangerous when firing in a sealed container in accordance with the present process.

The phosphor can also incorporate other materials as activators to supplement the copper activator. As an example, two mole percent of manganese can be used to supplement the copper activator in the foregoing examples.

It will be recognized that the objects of the invention have been achieved by providing an electroluminescent phosphor wherein the color can be readily varied throughout much of the visible spectrum, including the red region. In addition, there has been provided a red-emitting electroluminescent phosphor which can be prepared without the use of extremely toxic materials. There has also been provided a method for preparing electroluminescent phosphor which incorporates volatile mercuric sulfide as a basic constituent and in addition, method details have been provided.

While best embodiments of the invention have been illustrated and described hereinbefore, it should be particularly understood that the invention is not limited thereto or thereby.

I claim:

1. An electroluminescent phosphor having as a basic matrix group IIB metal sulfide selected from one of the group consisting of zinc-mercuric sulfide and zinc-cadmium-mercuric sulfide, said phosphor including copper as activator, an atom ratio of zinc to mercury in said phosphor of from 100:1 to 3:1, an atom ratio of cadmium to mercury in said phosphor less than 1.5:1, and copper having been included in the raw mix for said phosphor in compound form in amount of from 0.00075 to 0.035 gram atom of copper per gram mole of said group IIB metal sulfide.

2. An electroluminescent phosphor having as a basic matrix group IIB metal sulfide selected from one of the group consisting of zinc-mercuric sulfide and zinc-cadmium-mercuric sulfide, said phosphor including copper as activator, an atom ratio of zinc to mercury in said phosphor of from 100:1 to 3:1, an atom ratio of cadmium to mercury in said phosphor less than 1.5:1, copper having been included in the raw mix for said phosphor in compound form in amount of from 0.00075 to 0.035 gram atom of copper per gram mole of said group IIB metal sulfide, and any excess copper having been washed from said phosphor after preparation.

3. An electroluminescent phosphor having as a basic matrix group IIB metal sulfide selected from one of the group consisting of zinc-mercuric sulfide and zinc-cadmium-mercuric sulfide, said phosphor including copper as activator, an atom ratio of zinc to mercury in said phosphor of from 100:1 to 3:1, an atom ratio of cadmium to mercury in said phosphor less than 1.5:1, and copper having been included in the raw mix for said phosphor in compound form in amount of from 0.00075 to 0.01 gram atom of copper per gram mole of said group IIB metal sulfide.

4. An electroluminescent phosphor having as a basic matrix group IIB metal sulfide selected from one of the group consisting of zinc-mercuric sulfide and zinc-cadmium-mercuric sulfide, said phosphor including copper as activator, an atom ratio of zinc to mercury in said phosphor of from 100:1 to 3:1, an atom ratio of cadmium to mercury in said phosphor less than 1.5:1, copper having been included in the raw mix for said phosphor in compound form in amount of from 0.00075 to 0.01 gram atom of copper per gram mole of said group IIB metal sulfide, and any excess copper having been washed from said phosphor after preparation.

5. An electroluminescent phosphor having as a basic matrix group IIB metal sulfide selected from one of the group consisting of zinc-mercuric sulfide and zinc-cadmium-mercuric sulfide, said phosphor including charge-compensated copper as activator, an atom ratio of zinc to mercury in said phosphor of from 100:1 to 3:1, an atom ratio of cadmium to mercury in said phosphor less than 1.5:1, and copper in compound form having been included in the raw mix for said phosphor in such amount as to provide from 0.00075 to 0.035 gram atom of copper per gram mole of said group IIB metal sulfide.

6. An electroluminescent phosphor having as a basic matrix group IIB metal sulfide selected from one of the group consisting of zinc-mercuric sulfide and zinc-cadmium-mercuric sulfide, said phosphor including charge-compensated copper as activator, an atom ratio of zinc to mercury in said phosphor of from 100:1 to 3:1, an atom ratio of cadmium to mercury in said phosphor less than 1.5:1, copper in compound form having been included in the raw mix for said phosphor in such amount as to provide from 0.00075 to 0.035 gram atom of copper per gram mole of said group IIB metal sulfide, and any excess copper having been washed from said phosphor after preparation.

7. An electroluminescent phosphor having as a basic matrix zinc-cadmium-mercuric sulfide, said phosphor including charge-compensated copper as activator, an atom ratio of zinc to mercury in said phosphor of from 100:1 to 3:1, an atom ratio of cadmium to mercury in said phosphor less than 1.5:1, and copper in compound form having been included in the raw mix for said phosphor in such amount as to provide from 0.00075 to 0.01 gram atom of copper per gram mole of said zinc-cadmium-mercuric sulfide.

8. An electroluminescent phosphor having as a basic matrix zinc-cadmium-mercuric sulfide, said phosphor including charge-compensated copper as activator, an atom ratio of zinc to mercury in said phosphor of from 100:1 to 3:1, an atom ratio of cadmium to mercury in said phosphor of from 1:1 to 1:3, and copper in compound form having been included in the raw mix for said phosphor in such amount as to provide from 0.00075 to 0.01 gram atom of copper per gram mole of said zinc-cadmium-mercuric sulfide.

9. An electroluminescent phosphor having as a basic matrix zinc-mercuric sulfide, said phosphor including charge-compensated copper as activator, an atom ratio of zinc to mercury in said phosphor of from 100:1 to 3:1, and copper in compound form having been included in the raw mix for said phosphor in such amount as to provide from 0.00075 to 0.01 gram atom of copper per gram mole of said zinc-mercuric sulfide.

10. The method of preparing electroluminescent phosphor having as a basic matrix group IIB metal sulfide and including copper as activator, which method comprises: preparing a phosphor raw mix by adding mercuric sulfide to one of the group consisting of processed copper-activated zinc sulfide electroluminescent phosphor and processed copper-activated zinc-cadmium sulfide phosphor in such amount that the atom ratio of zinc to mercury in said raw mix is from 100:1 to 3:1, the atom ratio of cadmium to mercury in said raw mix is less than 1.5:1, and the atom ratio of copper to said group IIB metal in said raw mix is from 0.00075:1 to 0.035:1; and firing said raw mix in an evacuated hermetically-sealed container at a temperature of from 600° C. to 1100° C. for at least 10 minutes with the lower the firing temperature, the longer the firing time.

11. The method of preparing electroluminescent phosphor having as a basic matrix group IIB metal sulfide and including copper as activator, which method comprises: preparing a phosphor raw mix by adding mercuric sulfide to one of the group consisting of processed copper-activated zinc sulfide electroluminescent phosphor and processed copper-activated zinc-cadmium sulfide phosphor in such amount that the atom ratio of zinc to mercury in said raw mix is from 100:1 to 3:1, the atom ratio of cadmium to mercury in said raw mix is less than 1.5:1, and the atom ratio of copper to said group IIB metal in said raw mix is from 0.00075:1 to 0.01:1; firing said raw mix in an evacuated hermetically-sealed container at a temperature of from 600° C. to 1100° C. for at least 10 minutes with the lower the firing temperature, the longer the firing time; cooling said fired phosphor; and washing said cooled phosphor in a solution which is a solvent for cuprous sulfide but which is not a solvent for zinc sulfide.

12. The method of preparing electroluminescent phosphor having as a basic matrix group IIB metal sulfide and including copper as activator, which method comprises: preparing a phosphor raw mix by adding mercuric sulfide to one of the group consisting of processed copper-activated zinc sulfide electroluminescent phosphor and processed copper-activated zinc-cadmium sulfide phosphor in such amount that the atom ratio of zinc to mercury in said raw mix is from 1000:1 to 3:1, the atom ratio of cadmium to mercury in said raw mix is less than 1.5:1, and the atom ratio of copper to said group IIB metal in said raw mix is from 0.00075:1 to 0.01:1; and firing said raw mix in an evacuated hermetically-sealed container at a temperature of from 800° C. to 950° C. for at least one hour.

13. The method of preparing electroluminescent phosphor having as a basic matrix group IIB metal sulfide and including copper as activator, which method comprises: preparing a phosphor raw mix by adding mercuric sulfide and elemental sulphur to one of the group consisting of processed copper-activated zinc sulfide electroluminescent phosphor and processed copper-activated zinc-cadmium sulfide phosphor in such amount that the atom ratio of zinc to mercury in said raw mix is from 100:1 to 3:1, the atom ratio of cadmium to mercury in said raw mix is less than 1.5:1, and the atom ratio of copper to said group IIB metal in said raw mix is from 0.00075:1 to 0.01:1; and firing said raw mix in an evacuated hermetically-sealed container at a temperature of from 600° C. to 1100° C. for at least 10 minutes with the lower the firing temperature, the longer the firing time.

14. The method of preparing electroluminescent phosphor having as a basic matrix group IIB metal sulfide and including copper as activator, which method comprises: preparing a phosphor raw mix by adding mercuric sulfide to processed copper-activated zinc-cadmium sulfide phosphor in such amount that the atom ratio of zinc to mercury in said raw mix is from 100:1 to 3:1, the atom ratio of cadmium to mercury in said raw mix is less than 1.5:1 and the atom ratio of copper to said group IIB metal in said raw mix is from 0.00075:1 to 0.01:1; and firing said raw mix in an evacuated hermetically-sealed container at a temperature of from 600° C. to 1100° C. for at least 10 minutes with the lower the firing temperature, the longer the firing time.

15. The method of preparing electroluminescent phosphor having as a basic matrix group IIB metal sulfide and including copper as activator, which method comprises: preparing a phosphor raw mix by adding mercuric sulfide and elemental sulphur to processed copper-activated zinc-cadmium sulfide phosphor in such amount that the atom ratio of zinc to mercury in said raw mix is from 100:1 to 3:1, the atom ratio of cadmium to mercury in said raw mix is from 1:1 to 1.3:1, and the atom ratio of copper to said group IIB metal in said raw mix is from 0.00075:1 to 0.01:1; and firing said raw mix in an evacuated hermetically-sealed container at a temperature of from 600° C. to 1100° C. for at least 10 minutes with the lower the firing temperature, the longer the firing time.

16. The method of preparing electroluminescent phosphor having as a basic matrix zinc-mercuric sulfide and including copper as activator, which method comprises: preparing a phosphor raw mix by adding mercuric sulfide to processed copper-activated zinc sulfide electroluminescent phosphor in such amount that the atom ratio of zinc to mercury in said raw mix is from 100:1 to 3:1, and the gram atom ratio of copper to the total moles of sulfide in said raw mix is from 0.00075:1 to 0.01:1; and firing said raw mix in an evacuated hermetically-sealed container at a temperature of from 600° C. to 1100° C. for at least 10 minutes with the lower the firing temperature, the longer the firing time.

17. An electroluminescent phosphor having as basic matrix group IIB metal sulfide selected from one of the group consisting of zinc-mercuric sulfide and zinc-cadmium-mercuric sulfide; said phosphor including copper as activator and sufficient coactivator material, differing by two in valence from copper activator, for good electroluminescent response; said coactivator selected from one of the group consisting of aluminum, scandium, gallium, indium, chlorine, bromine and iodine; an atom ratio of zinc to mercury in said phosphor of from 100:1 to 3:1; an atom ratio of cadmium to mercury in said phosphor less than 1.5:1; copper in compound form having been included in the raw mix for said phosphor in such amount as to provide from 0.00075 to 0.01 gram atom of copper per gram mole of said group IIB metal sulfide; metallic coactivator having been included in compound form in the raw mix for said phosphor in such amount as to provide from 0.00005 to 0.002 gram atom per gram mole of said group IIB metal sulfide; and halogen coactivator having been included in compound form in the raw mix for said phosphor in such amount as to provide from 0.00075 to 0.01 gram atom of halogen per gram mole of said group IIB metal sulfide.

References Cited in the file of this patent

UNITED STATES PATENTS 2,222,668    Knoll _____ Nov. 26, 1940